F. X. FREYDER.
COMBINATION TOOL.
APPLICATION FILED MAY 14, 1919.

1,398,323.

Patented Nov. 29, 1921.

Inventor.
F. X. Freyder.
Attorneys.

UNITED STATES PATENT OFFICE.

FRANK X. FREYDER, OF IOWA CITY, IOWA.

COMBINATION-TOOL.

1,398,323. Specification of Letters Patent. Patented Nov. 29, 1921.

Application filed May 14, 1919. Serial No. 297,027.

*To all whom it may concern:*

Be it known that I, FRANK X. FREYDER, of Iowa City, in the county of Johnson and State of Iowa, have invented certain new and useful Improvements in Combination-Tools; and I do hereby declare the following to be a full, clear, and exact description of the invention, such as will enable others skilled in the art to which it appertains to make and use the same.

My primary object is to simplify the construction and cost of manufacture and at the same time provide an accurate tool constituting a square, a bevel and a protractor for the use of machinists, carpenters and pattern makers.

Figure 1:
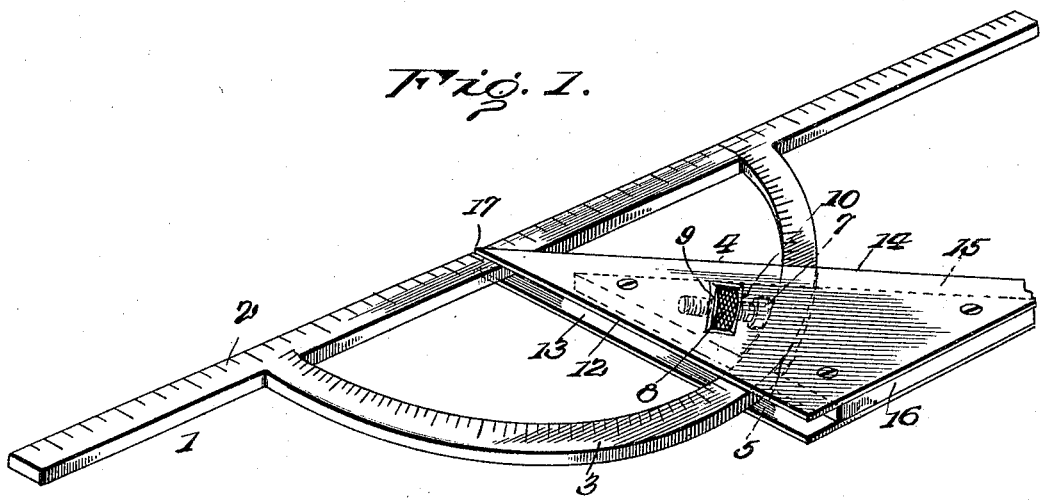
Figure 2:
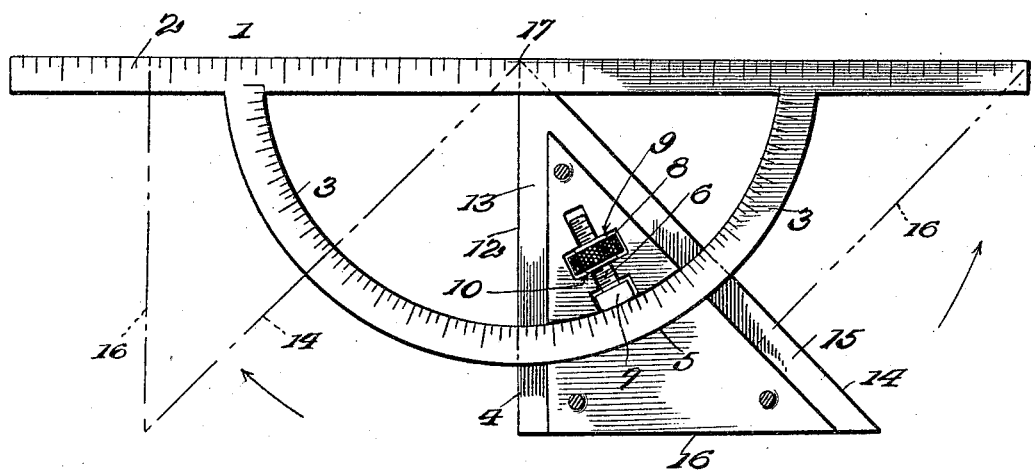

In the drawing, Figure 1 is a perspective of a combination tool embodying my invention. Fig. 2 shows various positions of the protractor.

I employ a base 1 constituting a straight edge which may, if desired, be equipped with a scale 2. Rigidly mounted upon the base is the angle gage plate 3 in the form of an arch in truly semicircular form and carefully graduated. 4 is the protractor arm. It is shown in the form of a right angle triangle made with a slot 5 extending longitudinally through its thickness to receive the angle gage plate 3 and of curvature exactly corresponding. Within its thickness the protractor arm carries a set screw 6 having a head 7 adapted to bind against the angle gage plate and curved to correspond to the curvature of the plate. A nut 8 on the screw projects slightly beyond each side face of the protractor arm so that the user may readily operate it and it bears against the walls 9 or 10 in the protractor arm.

The side 12 of the triangular protractor arm is formed with a central kerf 13 and the hypotenuse 14 has a similar kerf 15. The side 16, with the side 12, forms the right angle.

In practice the point 17 of the protractor arm, that is, the angle between the side 12 and the hypotenuse 14, where the two kerfs embrace the base, is always at a point of the base 1 corresponding to the center of the arched angle gage plate. In whatever direction the protractor arm may be moved and wherever it may be held fixed this point remains constant. This is due to the fact that the protractor arm in its movement necessarily describes an arc exactly corresponding to the curvature of the angle gage plate. When the protractor arm is in the full line position of Fig. 2 the side 12 is at right angles to the base and the side 16 is parallel with the base. When it is in the dotted line position at the right the sides 12, 16, are at bevel angles to the base and when it is in the position indicated at the left the side 16 is at right angles to the base and the hypotenuse is at an obtuse angle. In each of the positions referred to the kerfs 13 and 15 receive the base, being of depth to exactly correspond so that the edges will be in alinement. It will be noted that when the protractor arm is set for a square it is also a miter square and may constitute a bevel by adjusting the protractor arm to any desired point.

I claim as my invention:

1. A tool of the character described comprising a rigid base, an arch shaped angle gage plate consisting of a single graduated element having its two ends rigid on said base within the length thereof, an angular protractor arm movable on said plate and adapted to contact with said base at either side of said gage plate, and means for locking said protractor arm to said plate.

2. A tool of the character described comprising a rigid base, an arch shaped angle gage plate consisting of a single graduated element having its two ends rigid on said base within the length thereof, a protractor arm movable on said plate in the form of a right angle triangle and adapted to contact with said base at either side of said gage plate, and means for locking said protractor arm to said plate.

3. A tool of the character described comprising a rigid base, an arch shaped angle gage plate consisting of a single graduated element having its two ends rigid on said base within the length thereof, a protractor arm having a curved slot therein corresponding to and receiving said plate, and adapted to contact with said base at either side of said plate, and means for locking said protractor arm to said plate.

4. A tool of the character described comprising a base, an arch shaped angle gage plate mounted on said base, a triangular shaped protractor arm movable on said plate and having its point kerfed to receive said base.

5. A tool of the character described comprising a base, an arch shaped angle gage plate mounted on said base, a protractor arm movable on said plate in the form of a right angle triangle having kerfs formed in one of its right angular sides and in its hypotenuse.

6. A tool of the character described comprising a base, an arch shaped angle gage plate mounted on said base, and a triangular shaped protractor arm movable on said plate having a set screw formed with a head curved to correspond to the curvature of said angle plate gage.

In testimony whereof I have signed this specification.

F. X. FREYDER.